(12) United States Patent
Hunton

(10) Patent No.: US 7,095,798 B2
(45) Date of Patent: Aug. 22, 2006

(54) SYSTEM AND METHOD FOR POST FILTERING PEAK POWER REDUCTION IN MULTI-CARRIER COMMUNICATIONS SYSTEMS

(75) Inventor: Matthew J. Hunton, Liberty Lake, WA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 817 days.

(21) Appl. No.: 10/127,164

(22) Filed: Apr. 22, 2002

(65) Prior Publication Data

US 2003/0026351 A1    Feb. 6, 2003

Related U.S. Application Data

(60) Provisional application No. 60/309,571, filed on Aug. 2, 2001.

(51) Int. Cl.
*H04L 25/03* (2006.01)
*H03C 3/02* (2006.01)

(52) U.S. Cl. ......................... 375/296; 332/123

(58) Field of Classification Search ............... 375/295, 375/296, 130, 144, 285, 219, 222, 260; 332/117, 332/123; 370/335, 342, 441
See application file for complete search history.

(56) References Cited

U.S. PATENT DOCUMENTS

| | | |
|---|---|---|
| 3,898,566 A | 8/1975 | Switzer et al. |
| 4,878,232 A | 10/1989 | Fisher |
| 5,163,181 A | 11/1992 | Koontz |
| 5,228,055 A | 7/1993 | Uchida et al. |
| 5,249,201 A | 9/1993 | Posner et al. |
| 5,490,172 A | 2/1996 | Komara |
| 5,493,587 A | 2/1996 | Sandri et al. |
| 5,579,342 A | 11/1996 | Crozier |
| 5,608,760 A | 3/1997 | Sandri et al. |
| 5,621,762 A | 4/1997 | Miller et al. |
| 5,636,247 A | 6/1997 | Kamerman et al. |
| 5,638,404 A | 6/1997 | Crozier |
| 5,651,028 A | 7/1997 | Harris et al. |
| 5,727,026 A | 3/1998 | Beukema |
| 5,751,705 A * | 5/1998 | Sato ........................ 370/335 |
| 5,805,640 A | 9/1998 | O'Dea et al. |
| 5,822,360 A | 10/1998 | Lee et al. |

(Continued)

OTHER PUBLICATIONS

Muto et al. "A Peak Power Reduction Scheme with Adaptive Transmit Power Control for Multi-Carrier Transmission," IEEE 1999, pp. 2144-2148.*

(Continued)

*Primary Examiner*—Tesfaldet Bocure
(74) *Attorney, Agent, or Firm*—Myers Dawes Andras & Sherman, LLP.

(57) ABSTRACT

A system and method for post filtering signal peak reduction adapted for use in a multi-carrier communication system incorporating a source of a multi-carrier communication signal band limited in plural bands corresponding to the plural carriers. A first signal path receives as an input the band limited multi-carrier communication signal. A second parallel signal path includes a peak reduction calculation circuit for calculating a peak reduction correction signal and a plurality of filters providing a plurality of parallel filtering operations on the peak reduction correction signal corresponding to the plural bands to which the communication system is limited. The filtered peak reduction correction signals and delayed input signal are combined to provide peak adjusted output signals without violating the band limits of the communication signal or the modulation scheme of the communication signal.

36 Claims, 7 Drawing Sheets

U.S. PATENT DOCUMENTS

| | | |
|---|---|---|
| 5,930,678 A | 7/1999 | Alley et al. |
| 5,991,262 A | 11/1999 | Laird et al. |
| 6,009,090 A * | 12/1999 | Oishi et al. ............... 370/342 |
| 6,032,029 A | 2/2000 | Futagi et al. |
| 6,041,081 A | 3/2000 | O et al. |
| 6,125,103 A | 9/2000 | Bauml et al. |
| 6,128,351 A | 10/2000 | Jones et al. |
| 6,130,918 A | 10/2000 | Humphrey et al. |
| 6,175,551 B1 | 1/2001 | Awater et al. |
| 6,222,873 B1 | 4/2001 | Bang et al. |
| 6,229,995 B1 | 5/2001 | Lee |
| 6,236,864 B1 | 5/2001 | McGowan et al. |
| 6,240,141 B1 | 5/2001 | Long |
| 6,246,725 B1 | 6/2001 | Vanzieleghem et al. |
| 6,294,956 B1 | 9/2001 | Ghanadan |
| 6,356,606 B1 | 3/2002 | Hahm |
| 6,449,302 B1 * | 9/2002 | Hunton .................... 375/130 |
| 6,504,862 B1 | 1/2003 | Yang |
| 6,687,511 B1 * | 2/2004 | McGowan et al. ........ 455/522 |
| 6,701,163 B1 | 3/2004 | Hiramatsu ................ 455/561 |
| 6,931,053 B1 * | 8/2005 | McGowan ................ 375/146 |
| 6,931,079 B1 * | 8/2005 | Peeters .................... 375/296 |
| 6,931,239 B1 * | 8/2005 | Hongo et al. ............ 455/103 |
| 6,931,240 B1 * | 8/2005 | Hunton .................... 455/130 |
| 2002/0006169 A1 * | 1/2002 | Hunton .................... 375/295 |
| 2002/0191709 A1 * | 12/2002 | Hunton .................... 375/295 |
| 2003/0067995 A1 | 4/2003 | Matsuoka et al. |

OTHER PUBLICATIONS

Wireless Systems Design, Sep. 200, "Baseband Clipping Can Lead to Improved WCDMA Signal Quality", Paul Stadnik, pp. 40-44.

* cited by examiner

SYSTEM AND METHOD FOR POST FILTERING PEAK POWER REDUCTION IN MULTI-CARRIER COMMUNICATIONS SYSTEMS

RELATED APPLICATION INFORMATION

The present application claims priority under 35 USC §119(e) of provisional application Ser. No. 60/309,571 filed Aug. 2, 2001, the disclosure of which is incorporated herein by reference in its entirety.

BACKGROUND OF THE INVENTION

1. Field of the Invention

The present invention relates to communications systems that transmit signals that may be composed of plural combined transmit carriers. Each of these carriers may include one or more communication channels. More particularly, the present invention relates to wireless communications systems and signal processing apparatus employed in wireless communications systems. The term 'wireless communications systems' includes cellular communication systems, personal communication systems (PCS), wireless local loop systems, and all other like systems.

2. Background of the Prior Art and Related Information

Wireless communications systems employing transmission between base stations and remote users are a key component of the modern communications infrastructure. These communication systems are being placed under increasing performance demands that are taxing the capability of available equipment, especially wireless base station equipment. These increasing performance demands are due to both the increasing numbers of users within a given wireless region, as well as the bandwidth requirements allocated to wireless system service providers. The increasing number of wireless users is of course readily apparent and this trend is unlikely to slow due to the convenience of wireless services. The second consideration is largely due to the increased types of functionality provided by wireless systems, such as wireless Internet access and other forms of wireless data transfer over such systems. These considerations have resulted in a need for more carriers operating from each transmitting location of a wireless service network.

There are several methods for creating multiple communication channels on a single carrier. These methods include code division multiple access (CDMA), time division multiple access (TDMA), as well as others. In each of these methods, several data channels enter a signal generator that combines the input data channels using one or more of the methods mentioned above to produce a complex signal output. FIG. 1 shows M multiple channel signal generators 1 each producing a complex pair of signal outputs labeled $V_{m,1}$ and $V_{m,2}$. Each of these complex pairs is then filtered 2, frequency converted 7, and combined 8 to produce a single complex pair. This data pair is then D/A converted 3 to a baseband analog signal, modulated 4 to RF, amplified 5 and transmitted with an antenna 6.

When generating a multiple carrier signal as shown in FIG. 1, the output signal peak-to-average ratio is determined by the signal generators 1, the filters 2, frequency offset 7, and the interaction of each carrier in combining 8. The combined multiple carrier signal must then be D/A converted, modulated to RF, and amplified. High peak-to-average ratios require increased cost in D/A converter 3, RF up converting modulator 4, and power amplifier 5 components. D/A converters with large bit counts must be used to both create the large peaks and maintain adequate signal resolution to overcome noise generated in the D/A conversion process. High peak-to-average ratios require the use of very linear RF up converting modulator and power amplifier components to prevent signal distortion from increasing carrier bandwidth through distortion and intermodulation. Signal bandwidth is government regulated. Increased carrier bandwidth may cause operation outside government allocated operating bands in violation of the law. Therefore, a need presently exists for a communications system that reduces or eliminates high peak-to-average ratios.

SUMMARY

In a first aspect the present invention provides a multi-carrier communication system, comprising a plurality of communication signal sources each providing a band limited communication signal. A plurality of frequency converters offset the frequency of the plural band limited communication signals and a first combiner combines the plural frequency offset band limited communication signals to form a band limited multi-carrier communication signal. A peak reduction unit is coupled to receive the band limited multi-carrier communication signal and provide a band limited peak reduced multi-carrier output signal. The peak reduction unit comprises a peak reduction calculation circuit for providing a peak reduction correction signal determined from the communication signal and a signal peak limit value, a plurality of correction filters for filtering the peak reduction correction signal and providing a plurality of band limited peak reduction correction signals, and a second combiner for combining the band limited multi-carrier communication signal and the plurality of band limited peak reduction correction signals to provide a peak reduced multi-carrier output signal band limited in plural bands.

In one preferred implementation the plurality of correction filters is equal in number to the number of communication signal sources. Alternatively, the plurality of correction filters may be less than the number of communication signal sources. In such an embodiment at least one of the correction filters will have a pass band corresponding to plural bands of the multi-carrier communication signal. The peak reduction unit may further comprise a delay for delaying the band limited communication signal and providing the delayed signal to the second combiner. The peak reduction calculation circuit employed in the peak reduction unit may comprise an algorithm processor which calculates the correction signal from the difference between the input communication signal and the signal hard limited to the signal peak limit value. Each of the communication signal sources of the communication system may comprise a modulation filter for limiting the bandwidth of the communication signal. In this case each of the correction filters may be a band pass equivalent of one of the modulation filters. The communication system may further comprise a digital-to-analog conversion stage for converting the peak reduced output signal to an analog signal, a power amplifier receiving and amplifying the analog signal and an antenna coupled to the output of the power amplifier.

In another aspect the present invention provides a peak reduction unit adapted for use in a multi-carrier communication system. The peak reduction unit comprises a first signal path receiving a multi-carrier input signal band limited in plural bands, the first signal path including a delay circuit for delaying the input signal. The peak reduction unit further comprises a second parallel signal path receiving the band limited multi-carrier input signal. The second parallel signal path includes a peak reduction calculation circuit for calculating a peak reduction correction, a plurality of gain circuits receiving the peak reduction correction and providing plural gain adjusted peak reduction corrections, and a plurality of filters providing a filtering operation on the respective plural peak reduction corrections and providing plural filtered peak reduction corrections. The peak reduction unit further comprises a combiner combining the plural filtered peak reduction corrections and the delayed multi-carrier input signal to provide a peak adjusted multi-carrier output signal.

In a preferred embodiment of the peak reduction unit the second signal path may further comprise a signal magnitude detector, a comparator for comparing the signal magnitude to a predetermined limit value and a switch coupled to the output of the comparator and the peak reduction calculation unit for selecting the peak reduction correction if the signal magnitude exceeds the predetermined limit value. Also, in one embodiment of the peak reduction unit the gain circuits adjust the magnitude of the correction by different gain values. The input multi-carrier signal may comprise at least one unused communication carrier band and the unused communication carrier band or bands may be used to contain a gain controlled portion of the peak reduction correction signal at the peak reduction unit output. Also, or in the alternative, the input multi-carrier signal may comprise carriers more tolerant to communication errors along with carriers less tolerant to communication errors and the gain value may be adjusted to be higher for the carriers more tolerant to communication errors. The gain circuits may each comprise a multiplier receiving the peak reduction correction signal and multiplying it by a respective different gain value. The gain circuits may be coupled between the peak reduction calculation circuit and the filters. The input signal may comprise digital samples represented by complex vectors and the peak reduction calculation circuit may comprise an algorithm processor which performs a complex vector calculation on the input samples to determine a complex correction vector which when added to the input sample results in a signal magnitude at or within a predetermined limit value. In one embodiment each of the filters provides a filtering operation limiting the correction signal to a frequency band corresponding to a band pass equivalent of one of the plural bands of the multi-carrier input signal. Alternatively, at least one of the filters may provide a filtering operation limiting the correction signal to a frequency band corresponding to plural adjacent bands of the multi-carrier input signal.

In another aspect the present invention provides a method for signal peak reduction in a multi-carrier communication system. The method comprises receiving as an input a multi-carrier communication signal band limited in plural bands and providing a peak reduction correction signal based on the amount the multi-carrier communication signal exceeds a threshold signal peak limit value. The method further comprises splitting the peak reduction correction signal into plural peak reduction correction signals on parallel signal paths and filtering the plural peak reduction correction signals to limit the bandwidth of the peak reduction correction signals. The method further comprises combining the filtered peak reduction correction signals and the input multi-carrier communication signal to provide a peak reduced output communication signal band limited in a plurality of separate bands.

In a preferred embodiment the method for signal peak reduction in a multi-carrier communication system further comprises delaying the input multi-carrier communication signal prior to combining with the filtered peak reduction correction signal. Also, the method preferably comprises gain adjusting the peak reduction correction signals before the combining. The gain adjusting may employ a different gain value for different ones of the plural peak reduction correction signals. Providing a peak correction signal preferably comprises performing a peak reduction algorithm on the input multi-carrier communication signal to determine the peak correction signal. The method may further comprise detecting the magnitude of the input multi-carrier communication signal and comparing the magnitude to the signal peak limit value and outputting the peak reduction correction signal to be filtered and combined only when the magnitude of the input multi-carrier communication signal exceeds the magnitude of the signal peak limit value. The filtering operation may limit the respective peak reduction correction signals to different frequency bands corresponding to the plural bands of the input multi-carrier communication signal. More specifically, the filtering operation may limit the peak reduction correction signals to frequency bands which are band pass equivalents of the respective plural bands of the input multi-carrier communication signal. Alternatively, the filtering operation may limit the peak reduction correction signals to frequency bands which are narrower than the respective plural bands of the input multi-carrier communication signal. In another approach, the filtering operation may limit at least one of the peak reduction correction signals to a frequency band corresponding to plural adjacent bands of the multi-carrier input signal. Furthermore, the filtering operation may limit plural of the peak reduction correction signals to frequency bands each corresponding to plural adjacent bands of the multi-carrier input signal. In another specific application the multi-carrier communication signal may comprise bands more and less tolerant to communication errors. In such an application the gain value employed may be higher for the bands more tolerant to communication errors. For example, bands more tolerant to communication errors may comprise voice bands and bands less tolerant to communication errors may comprise data bands. As another example, the multi-carrier communication signal may comprise an unused band or bands and the unused band or bands may be used to contain a gain controlled portion of the peak reduction correction signal. Also, or in the alternative, the different gain values may be determined based on the signal power of the corresponding band.

Further features and aspects of the present invention will be appreciated by review of the following detailed description of the invention.

DETAILED DESCRIPTION OF THE INVENTION

Figure 1:
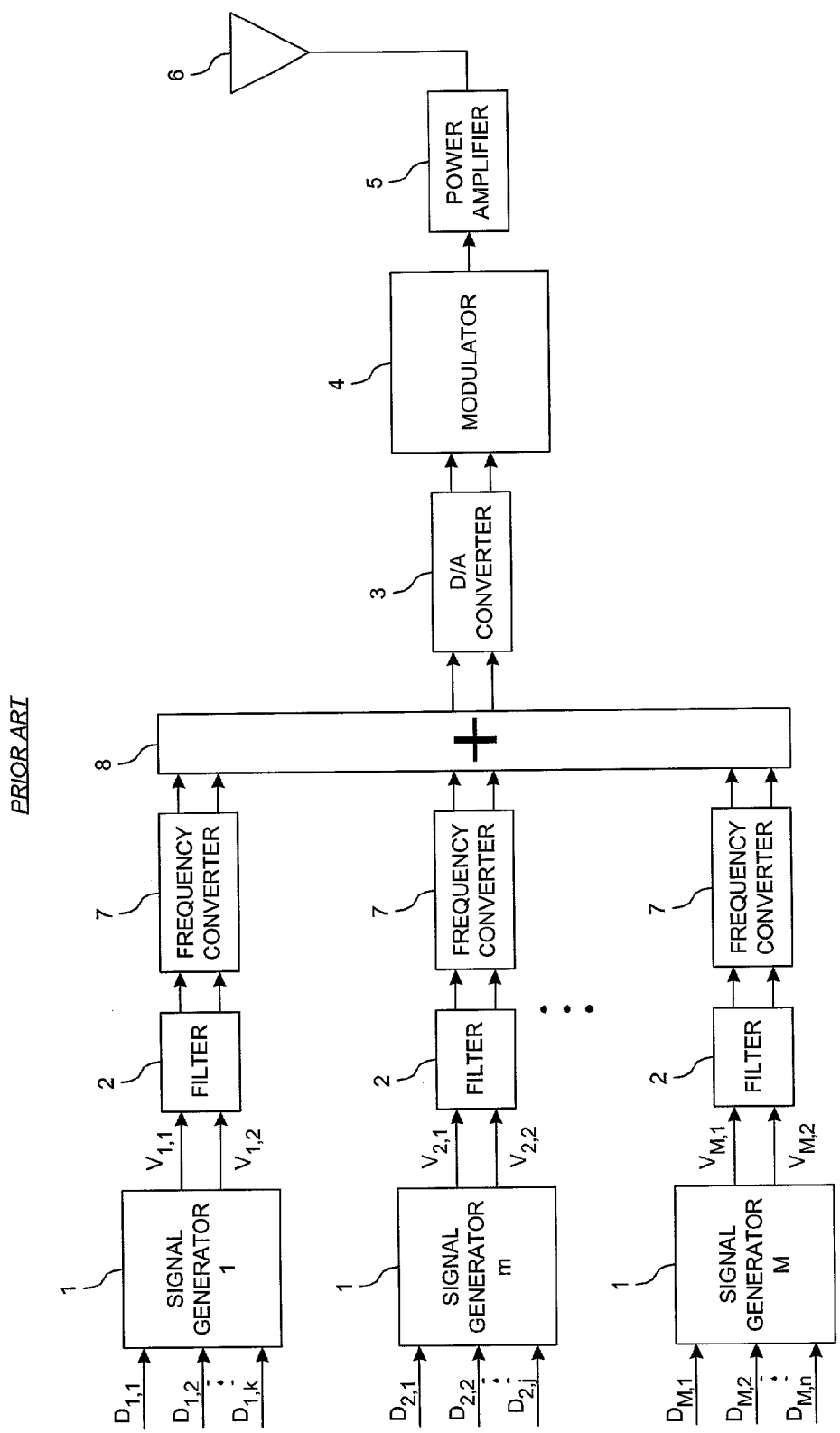
FIG. 1 is a block schematic drawing of a prior art multiple carrier communications system.
Figure 2:
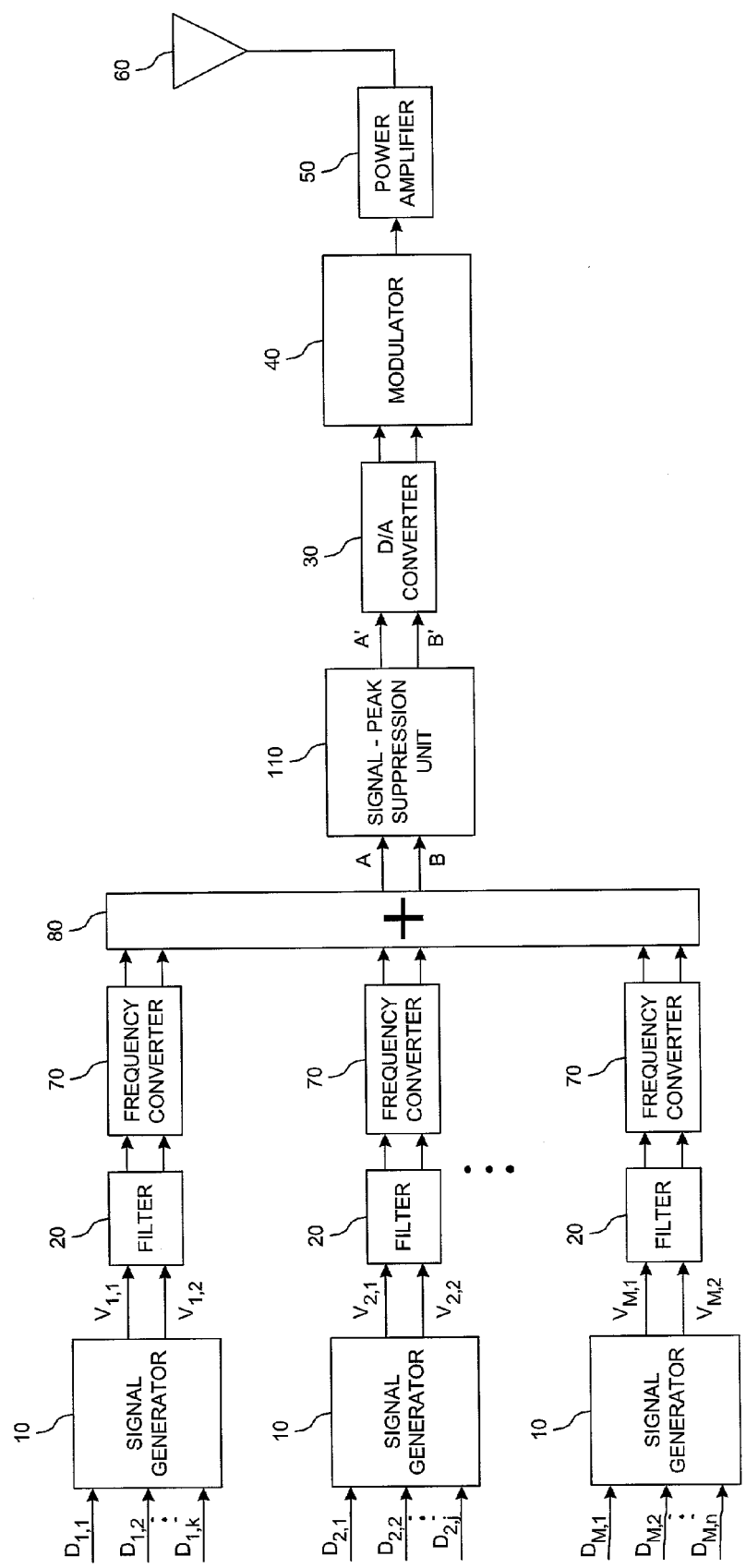
FIG. 2 is a block schematic drawing of the present invention showing signal-peak suppression just prior to D/A conversion in a multiple carrier communication system.

Referring to FIG. 2, a preferred embodiment of a multiple carrier communication system employing signal-peak suppression in accordance with the present invention is illustrated. A digitally sampled signal stream represented by an in-phase component stream A and a quadrature-phase component stream B is input to a signal-peak suppression unit 110. This digitally sampled signal stream represents plural transmit carriers with each of these transmit carriers providing one or more communication channels as produced by the signal generators 10, filters 20, frequency converters 70 and combiner 80. The individual carriers may comprise voice or data communication signals and for a given system all the carriers may be voice, all the carriers may be data or some of the carriers voice and some data. The signal-peak suppression unit outputs a peak-reduced signal stream represented by an in-phase component signal stream A' and a quadrature component signal stream B'. This peak-reduced signal is then D/A converted at D/A converter 30, modulated onto a RF carrier at RF up converting modulator 40, amplified by power amplifier 50, and transmitted with an antenna 60.

The communication signal which is input to the peak suppression unit 110 is band limited to a set of bands corresponding to the spectral band allocated to each carrier of the communication system, typically by a government body such as the FCC (Federal Communication Commission). This band limiting is typically provided by filters 20. These filters may be viewed as modulation filters since in addition to limiting the signal band to the allocated spectral mask for each carrier the trajectory of the signal waveform is modified in a manner that must be consistent with the modulation scheme. As will be discussed in detail below the signal peak suppression unit 110 peak suppresses the communication signal without violating the spectral band of the individual carrier signals or the modulation scheme.

Figure 3:
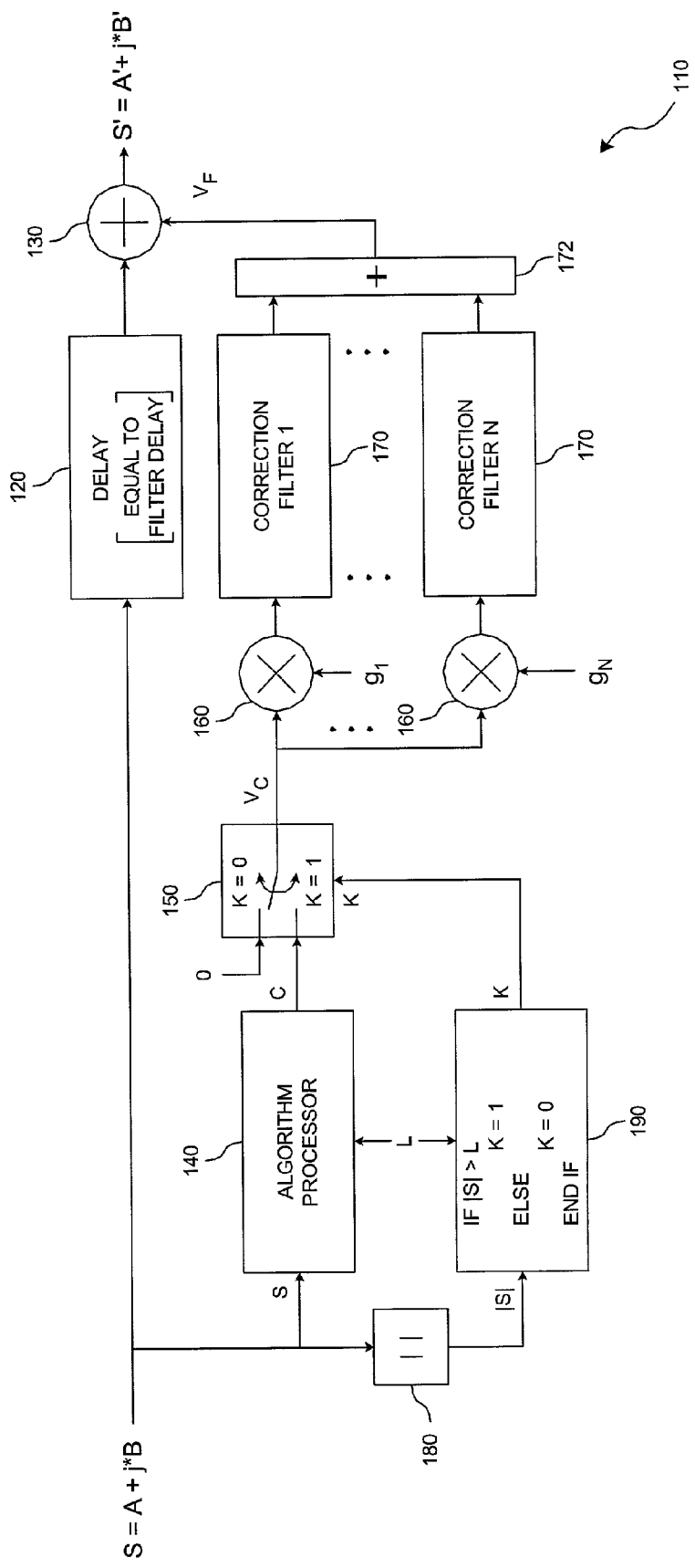
FIG. 3 is a detailed block schematic drawing of the of the signal-peak suppression unit shown FIG. 2.

Referring to FIG. 3, a detailed embodiment of the signal-peak suppression unit 110 of FIG. 2 is illustrated. The signal-peak suppression unit processes the in-phase and quadrature-phase component streams A and B as a single complex signal stream S. The signal-peak suppression unit includes two parallel signal paths, a first signal path with a delay 120 and a parallel correction signal path, which both receive the input multi-carrier signal S. A peak reduction calculation circuit in the correction signal path calculates a peak reduction correction based on the input signal S and a signal peak limiting constant L. In particular, in the illustrated embodiment, an algorithm processor 140 calculates a complex correction vector C based on each sample of S and the signal peak limiting constant L. The magnitude of each sample of S is determined at 180 and input to a switch driver 190, which controls switch 150. Switch 150 selects either the calculated correction vector C or the value zero depending on whether the magnitude of the current sample of S exceeds the limiting constant L. The output of switch 150 represents the difference between the input signal stream S and a version of S hard limited to the amplitude L. The output of the switch $V_C$ is then provided simultaneously to several parallel time delay matched correction filter paths.

Each correction filter path includes a gain circuit, comprising a gain constant $g_n$ provided to a respective multiplier 160, and a correction filter 170. The order of these circuits could be interchanged from that illustrated and the filters 170 may be provided before the gain circuits. The outputs of the correction filter paths are combined at combiner 172 to create a filtered correction signal $V_F$. The filtered correction signal stream $V_F$ is then combined at combiner 130 with a time-delayed version of the input complex signal stream S. Optionally a single combiner may be employed and the function of combiner 172 provided in combiner 130. The time delay 120 should be matched to the delay of the correction filters (plus any other significant delays which may be introduced in the bottom path of FIG. 3, e.g., by algorithm processor 140, depending on the processor speed). The combined signal stream S' is the peak-adjusted output signal stream that can be represented as in-phase component A' and quadrature component B' signal streams.

It is important to notice that the output signal stream S' is created from a delayed version of the input signal stream S and the filtered correction signal stream $V_F$. The filtered correction signal $V_F$ acts as interference to the transmission of data to the intended communication channel users on each of the carriers present in signal stream S. The gains $g_n$ adjusts the level of interference. If the gains $g_n$ were all set to zero the signal stream S would be transmitted without interference. Notice that the only change to the input signal stream S is the addition of $V_F$. The input signal stream S is not changed by either time varying gain control or filtering. Both filtering and time varying gain control of the signal stream S would cause modulation changes to the carriers present in signal stream S. In the present invention the modulation of the individual carriers present in the input signal stream S are unaffected by the addition of the filtered correction signal stream $V_F$.

The correction signal stream $V_C$ comprises a waveform and thus has an associated bandwidth. The parallel correction filters are required to limit the bandwidth of correction signal stream $V_C$ to the bandwidth allocated to the operator by an appropriate government body. The bandwidth and frequency dependent gain of the parallel correction filters should be set to meet government allocated spectrum emissions requirements. Several correction filter options exist. The first option would be to simply create one correction filter path for each carrier. The frequency dependent gain of each correction filter path would then match the performance of the corresponding filters 20 used in the multiple carrier generation shown in FIG. 2. Since the outputs of each filter shown in FIG. 2 are converted in frequency to a different band, the corresponding correction path filters should be band pass equivalents of those found in FIG. 2. That is, the correction path filters should have the same spectral response as the modulation filters 20 except offset in frequency by the frequency conversion offset. By using exact band pass equivalent filters the operator is guaranteed compliance with spectrum allocation and spectrum emission requirements. If desired however, band pass filters with narrower bandwidth performance could also be used. Narrower band filters may require less computation. A different correction path filter option could be used in the case where carriers are equally spaced with minimal frequency spacing. In this minimal frequency spaced case one correction filter may be used. The correction filter bandwidth should be set to cover all transmitted carriers. When such a filter is used the bandwidth of the correction signal $V_F$ will span the transmitted carriers but not exceed the bandwidth of the combined carriers. In another case, groups of minimally spaced carriers may exist. Each group, however, could be separated by more than the minimal spacing. In this case one correction path filter should be provided for each group of minimally spaced carriers. The frequency dependent gain of each correction filter used should then be set to cover the bandwidth of each minimally spaced carrier group.

The government may allocate to an operator more spectrum than they currently need to meet communication transmission needs. In such a case, the operator may choose to fill this unused spectrum space with a filtered portion of $V_C$. By transmitting a portion of $V_C$ in this allocated but unused spectrum the burden of peak reduction may be reduced for actual operating carriers. Any of the single or multiple correction filter examples described above can be used to operate with a portion of $V_C$ in the allocated by unused portion of spectrum.

Figure 4:
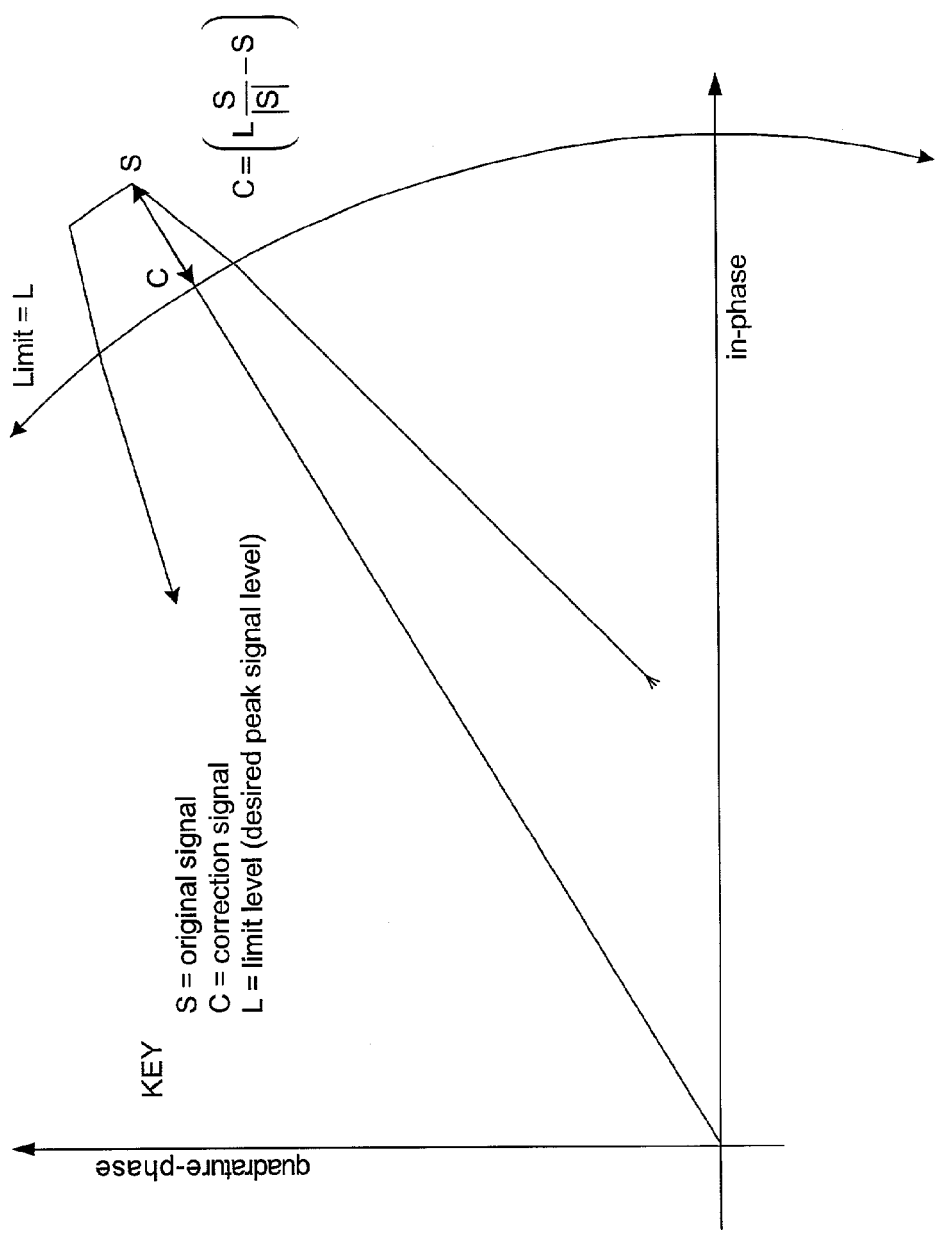
FIG. 4 shows a complex signal vector diagram detailing the calculation of the correction signal used to suppress the output signal peak power.

The algorithm processor 140 uses Equation (1) to calculate the correction vector C for each sample of S. This equation was developed geometrically from FIG. 4. FIG. 4 shows a time trajectory segment of the complex input signal stream S and a vector representing a single sample of S. At the time shown, the complex input signal S exceeds the limiting constant L by the complex vector C. The complex vector C is calculated using Equation (1).

$$C = \left( L\frac{S}{|S|} - S \right) \quad (1)$$

Referring to FIG. 3, the correction vector C only contributes to correction signal stream $V_C$ when the magnitude of a complex input signal sample of S exceeds the limiting constant L. If the output from the switch 150 were added directly to the input complex signal stream S, the output peak power would be clamped to the limiting constant L. Unfortunately, the bandwidth of the switch output would exceed the government allocated bandwidth required for the output signal. To limit the switch output bandwidth the correction signal stream $V_C$ is passed through the parallel correction filters 170.

Prior to passing through the correction filters each correction filter path is gain adjusted by a constant $g_n$. These constants serve two purposes. First, the constants are used to prevent excessive suppression of signal peaks. This excessive suppression is created when the correction signal $V_C$ is band limited by the parallel correction filters 170. An example will be given to illustrate this excessive suppression. Second, the constants are used to distribute the burden of peak power suppression to each allocated transmit band. This distribution is generally based on the power allocated to each carrier or transmit band of the signal S input to FIG. 3. If for example each carrier in the transmit band of S were allocated the same transmit power, and each carrier had a corresponding correction filter, each gain constant $g_n$ would be the same value intended only to prevent over suppression of signal peaks found in S. In such an example case a single application of gain could be provided prior to creating the parallel correction filter paths. In another example the input signal S may be composed of three carriers with average relative power levels of 1, 1, and 0.25 respectively. If each carrier had a corresponding correction path the gain constants may be set to $g_1 = g^*(1/2.5)$, $g_2 = g^*(1/2.5)$ and $g_3 = g^*(0.5/2.5)$ respectively (sqrt(1)+sqrt(1)+sqrt(0.25)=2.5). The remaining constant g would then be set to prevent over suppression of peaks found in S. In a final example, the operator may choose to place a greater burden of peak reduction on some correction filter bandwidths over others by increasing the gain constant for those bands. These bandwidths may be allocated but unused portions of spectrum as mentioned previously. By placing a greater (or the entire) burden on these allocated by unused portions of spectrum improved communications will exist in the used portions of spectrum. An operator may also choose to place a greater burden on carriers that can tolerate higher communication errors. For example carriers that carry data communication are less tolerant of errors than carriers that carry voice communication and the voice bands may be multiplied by a higher gain constant than data bands. Therefore, by adjusting the gain constants $g_n$, overall communication performance can be optimized while applying peak power reduction.

Figure 5:
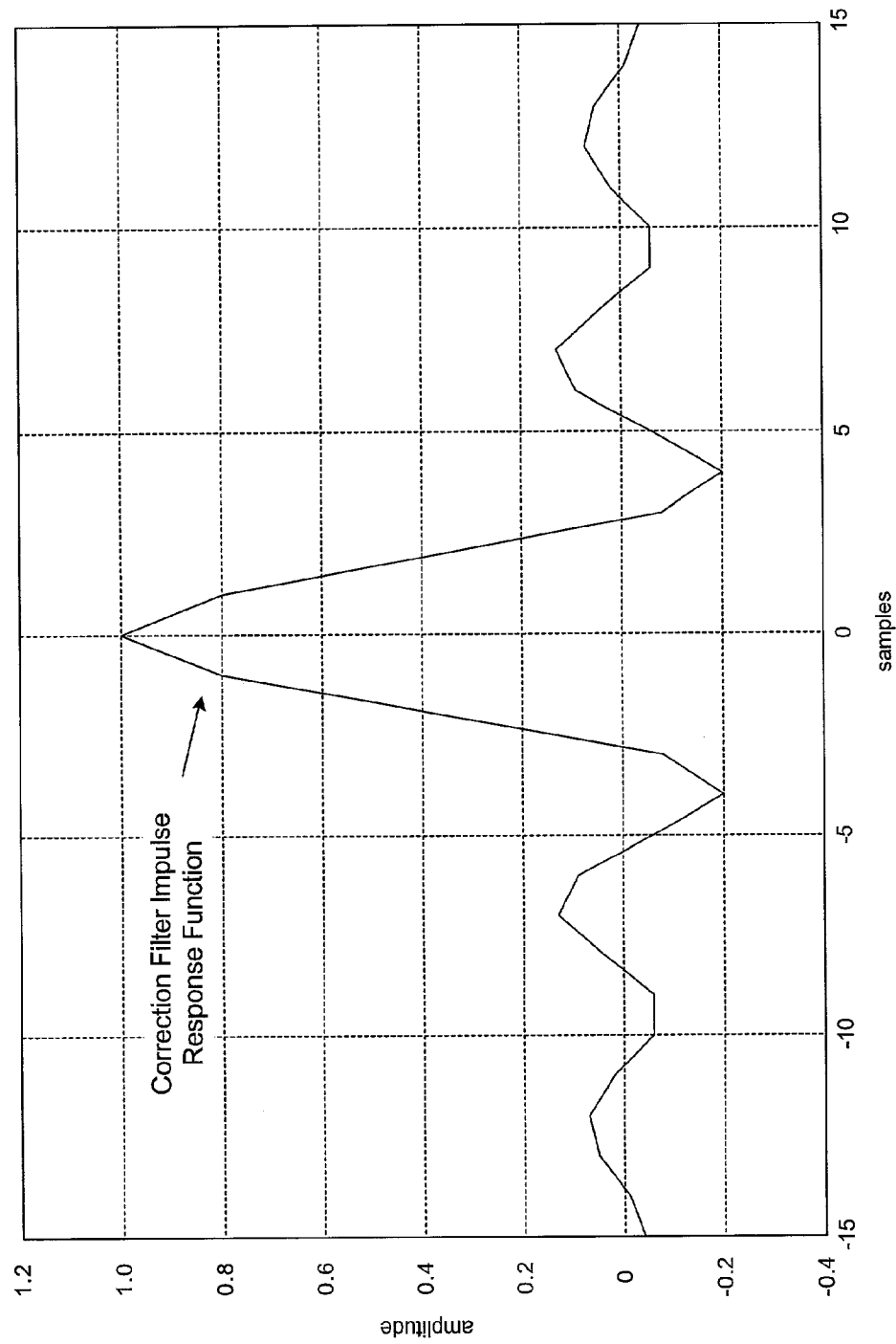
FIG. 5 shows the impulse response function of a correction filter used to limit the bandwidth of the correction signal calculated in FIG. 4.

To illustrate an example of over suppression of signal peaks caused by band limiting the correction signal $V_C$, consider one correction filter, corresponding to one band and one carrier of the multi-carrier signal or several closely spaced carriers in the case where the peak signal of several minimally spaced carriers are suppressed using only one correction filter. Each sample of $V_C$ input to the correction filter would produce an output reproduction of the correction filter impulse response function that is gain adjusted by the input sample. These reproductions are combined to produce the correction filter output. FIG. 5 shows a typical impulse response function that may be produced by a correction filter. This impulse response function is shown for example purposes only. The impulse response function used in each correction filter path of an actual functioning system will be determined by system needs. For example, as discussed above in one preferred embodiment filters 170 may be band pass equivalents of filters 20 (shown in FIG. 2). That is, the correction path filters 170 should have an impulse response function chosen so they have the same spectral response as the modulation filters 20 except offset in frequency by the frequency conversion offset. Therefore, plural different impulse response functions will be provided for respective filters 170 to provide band pass equivalent responses to the plural modulation filters 20. Alternatively, as noted above band pass filters 170 with narrower bandwidth performance than the corresponding modulation filters 20 could be used and the impulse response functions modified accordingly and in a manner known to those skilled in the art. Alternatively, where carriers are equally spaced with minimal frequency spacing one correction filter 170 may be used for plural bands corresponding to plural adjacent carriers. The correction filter impulse response function will then be chosen to provide a pass bandwidth set to cover all of the plural adjacent transmit carriers. In yet another application and corresponding embodiment, groups of minimally spaced carriers may exist but with each group separated by more than the minimal spacing. In this case one correction path filter 170 should be provided for each group of minimally spaced carriers and the impulse response function of each correction filter used should then be chosen to cover the bandwidth of the corresponding minimally spaced carrier group. Therefore, it will be appreciated that the various impulse response functions and variations in choice of correction filters 170 are too numerous to enumerate in detail and the appropriate modifications will be apparent to those skilled in the art and are within the scope of the present invention.

Figure 6:
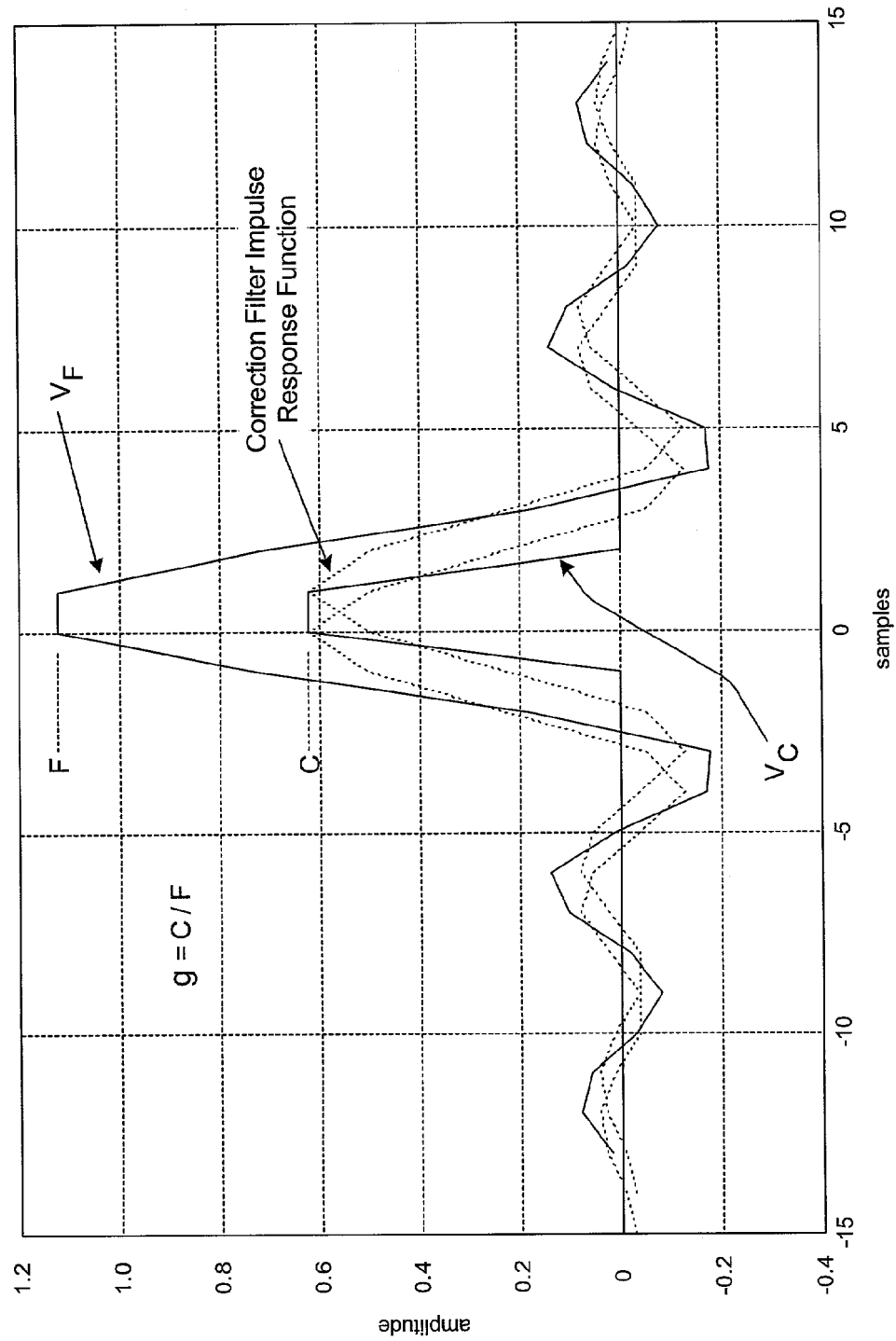
FIG. 6 shows the effect filtering has on an example correction signal and illustrates the advantages of gain weighting the correction signal.

Using the sample impulse response function of FIG. 5 it is instructive to examine the correction filter output based on a few simple example $V_C$ signal streams. Consider a short duration peak signal stream S that produces a correction signal $V_C$ composed of two equal amplitude correction samples in time sequence. These two correction samples would be preceded and followed by zero valued samples based on the switch 150 selection. The correction filter input and output signals $V_C$ and $V_F$ for this example are both shown in FIG. 6. The two non-zero input samples of $V_C$ are just over 0.6 in amplitude. The figure shows how the impulse response function of the correction filter acts on $V_C$ to create $V_F$. The filtered correction signal amplitude F corresponds to the input signal correction amplitude C in FIG. 6. To prevent over compensation, a gain adjustment $g_1$ must be applied in the correction signal generation path prior to combining with signal S in FIG. 3. For the example shown, FIG. 6 calculates this gain $g_1$ by simply taking the ratio of C over F.

The gain calculation in the last paragraph was specific to the example $V_C$ sample stream described. If the correction filter input signal stream were just one correction sample preceded and followed by zero valued samples, the filter input and output amplitudes would have been the same at the required correction instant. In this second example, the gain $g_1$ calculated would have been one.

The two examples used to evaluate the gain constant $g_1$ provided different gains for different correction signal input examples. Any real correction signal $V_C$ will produce an infinite number of similar type examples. The gain constant $g_1$ used must provide the best possible peak signal suppression for all possible variations in $V_C$. Typical variations in $V_C$ can be determined by performing a trial using a representative fixed time length complex input signal S, and a fixed limiting constant L. With a typical $V_C$ signal produced, a series of test trials can be performed with different gain $g_1$ constants. From these trials, curves of S' peak-to-average ratio versus gain $g_1$ and $V_F$ signal power versus gain $g_1$ can be plotted to determine the best performance producing gain $g_1$ value.

Figure 7:
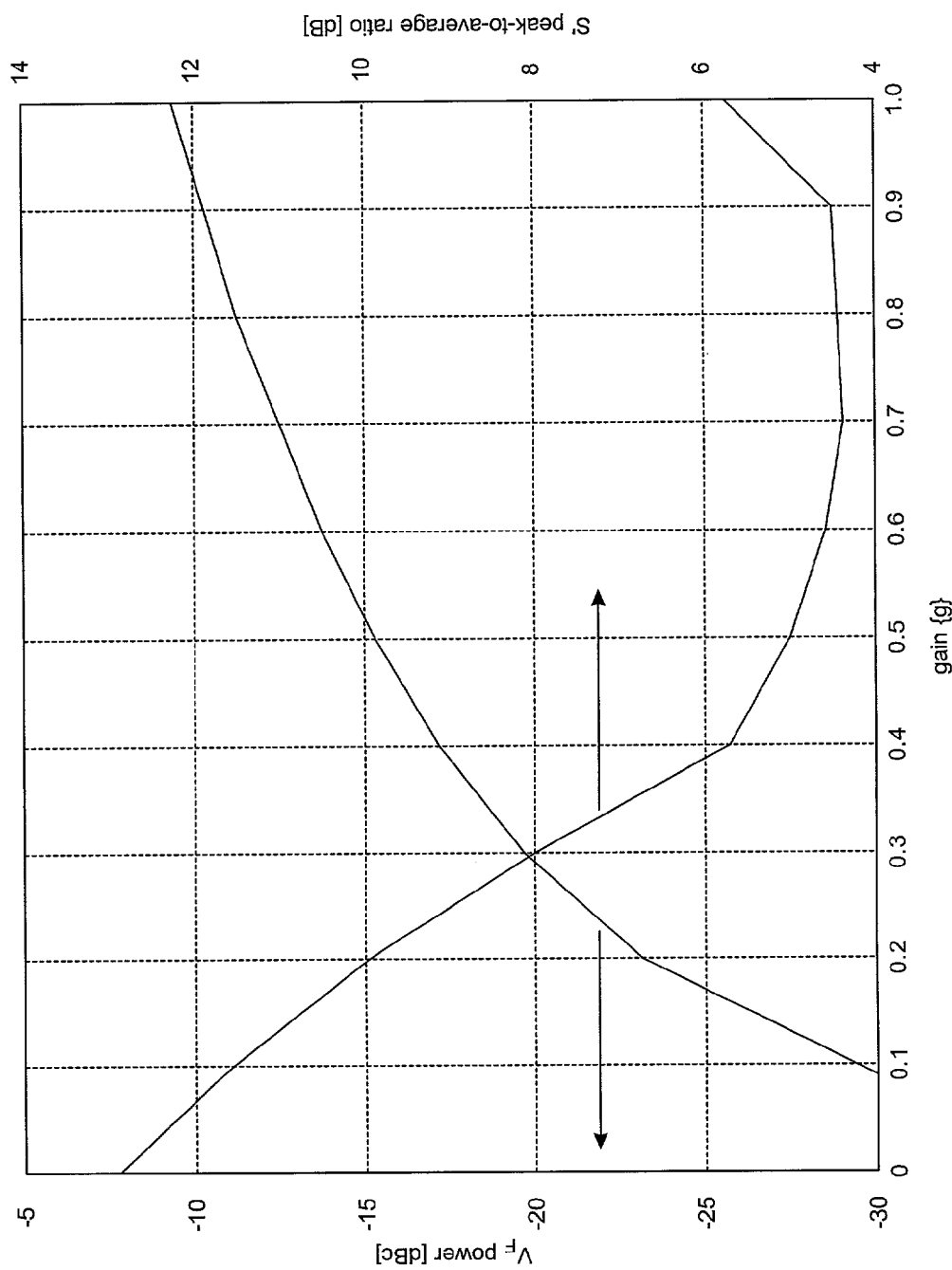
FIG. 7 shows a graphical approach to determining the gain weighting constant used.

FIG. 7 shows an example set of these curves for a specific test case. The exact particulars of the test case are not important. The curves are shown as an example on how to select the best performing gain $g_1$ constant. One curve in FIG. 7 shows the power of $V_F$ measured relative to the power in S just prior to combining with S. The other curve shows the peak-to-average ratio of the output signal S'. $V_F$ signal power represents distortion in the output complex signal S'. $V_F$ signal power should be kept to a minimum to avoid degrading overall system communication quality. FIG. 7 shows that lower gains produce lower $V_F$ signal power but also lower reduction in S' peak-to-average ratio. The S' peak-to-average ratio curve shows a knee in the peak-to-average reduction at $g_1$ equal to 0.4. Increasing gain $g_1$ much beyond 0.4 could increase the output signal distortion caused by $V_F$ without significant additional suppression of peak power. The gain value should be less than 1 when the peak impulse response of the correction filter is normalized to 1. In a more general case the gain value should be greater than zero but less than a level that would cause the peak to average ratio to begin increasing.

The gain $g_1$ selection demonstrated above was shown for demonstration purposes only. In an actual system several gain constants would need to be determined. These gain constants would be determined in a two step process. First a method of distribution would be determined. Several examples were given based on carrier power distribution and carrier communication error requirements. One example given above was for distribution based on power weighting. This method provides the same signal-to-suppression effects on each carrier. Other beneficial distribution methods may exist based on the specific application. With the method of distribution set a common gain constant g would then be set using the method described above for the single correction path example.

Finally, further signal-peak suppression can be achieved by cascading in series multiple signal-peak suppression units 110 shown in FIG. 2. By cascading signal-peak suppression stages less signal distortion will be present in the eventual output signal than if a larger gain value were selected in a single stage process. The method shown in FIG. 7 should be used to determine the gain $g_1$ constant for each stage. Since the input to each successive stage is already peak reduced, the gain $g_1$ constant should be optimized to a different value for each stage. When performing test trials on successive stages the input signal used should be the peak-reduced signal from the preceding stage where the gain $g_1$ has been previously optimized. If the limiting constant L is the same for each successive stage, the output signal peak will closely approach the limiting constant L within two or three successive stages.

The present invention thus provides a multi-carrier communications system employing a signal-peak suppression unit that is inserted just prior to D/A conversion. By doing so, the complexity and cost of the D/A converter, RF up converting modulator, and power amplifier will be reduced. Further features and advantages of the present invention will be appreciated by those skilled in the art.

A number of different embodiments of the present invention have been described in relation to the various figures. Nonetheless, it will be appreciated by those skilled in the art that a variety of additional embodiments are possible within the teachings of the present invention. For example, a variety of specific peak reduction correction calculation circuits implementing specific algorithms may be provided, a variety of different correction filter implementations and band pass characteristics may be provided, and a variety of different gain weighting embodiments may be provided, all employing the teachings of the present invention and limitations of space prevent an exhaustive list of all the possible circuit implementations or an enumeration of all possible algorithms. A variety of other possible modifications and additional embodiments are also clearly possible and fall within the scope of the present invention. Accordingly, the described specific embodiments and implementations should not be viewed as in any sense limiting in nature and are merely illustrative of the present invention.

What is claimed is:

1. A multi-carrier communication system, comprising:
   a plurality of communication signal sources each providing a band limited communication signal;
   a plurality of frequency converters for offsetting the frequency of the plural band limited communication signals;
   a first combiner for combining the plural frequency offset band limited communication signals to form a band limited multi-carrier communication signal; and
   a peak reduction unit coupled to receive said band limited multi-carrier communication signal and provide a band limited peak reduced multi-carrier output signal, the peak reduction unit comprising:
   a peak reduction calculation circuit for providing a peak reduction correction signal determined from the communication signal and a signal peak limit value,
   a plurality of correction filters for filtering the peak reduction correction signal and providing a plurality of band limited peak reduction correction signals, and a second combiner for combining said band limited multi-carrier communication signal and said plurality of band limited peak reduction correction signals to provide a peak reduced multi-carrier output signal band limited in plural bands.

2. A multi-carrier communication system as set out in claim 1, wherein said plurality of correction filters is equal in number to the number of communication signal sources.

3. A multi-carrier communication system as set out in claim 1, wherein said plurality of correction filters is less than the number of communication signal sources and wherein at least one correction filter has a pass band corresponding to plural bands of the multi-carrier communication signal.

4. A multi-carrier communication system as set out in claim 1, wherein said peak reduction unit further comprises a delay for delaying the band limited communication signal and providing the delayed signal to said second combiner.

5. A multi-carrier communication system as set out in claim 1, wherein said peak reduction calculation circuit comprises an algorithm processor which calculates said correction signal from the difference between the input communication signal and the signal hard limited to said signal peak limit value.

6. A multi-carrier communication system as set out in claim 1, wherein each of said signal sources comprises a modulation filter for limiting the bandwidth of the communication signal and wherein each of said correction filters is a band pass equivalent of one of said modulation filters.

7. A multi-carrier communication system as set out in claim 1, further comprising a digital-to-analog conversion stage for converting said peak reduced output signal to an analog signal.

8. A multi-carrier communication system as set out in claim 7, further comprising a power amplifier receiving and amplifying said analog signal.

9. A multi-carrier communication system as set out in claim 8, further comprising an antenna coupled to the output of the power amplifier.

10. A peak reduction unit adapted for use in a multi-carrier communication system, the peak reduction unit comprising:
    a first signal path receiving a multi-carrier input signal band limited in plural bands and including a delay circuit for delaying the input signal;
    a second parallel signal path receiving said band limited multi-carrier input signal and including a peak reduction calculation circuit for calculating a peak reduction correction, a plurality of gain circuits receiving the peak reduction correction and providing plural gain adjusted peak reduction corrections, and a plurality of filters providing a filtering operation on the respective plural peak reduction corrections and providing plural filtered peak reduction corrections; and
    a combiner combining the plural filtered peak reduction corrections and the delayed multi-carrier input signal and providing a peak adjusted multi-carrier output signal.

11. A peak reduction unit as set out in claim 10, wherein said second signal path further comprises a signal magnitude detector, a comparator for comparing the signal magnitude to a predetermined limit value and a switch coupled to the output of the comparator and the peak reduction calculation unit for selecting said peak reduction correction if the signal magnitude exceeds the predetermined limit value.

12. A peak reduction unit as set out in claim 10, wherein said gain circuits adjust the magnitude of the correction by different gain values.

13. A peak reduction unit as set out in claim 12, wherein said input multi-carrier signal comprises at least one unused communication carrier band and wherein the unused communication carrier band or bands are used to contain a gain controlled portion of the peak reduction correction signal at the peak reduction unit output.

14. A peak reduction unit as set out in claim 12, wherein said input multi-carrier signal comprises carriers more tolerant to communication errors along with carriers less tolerant to communication errors and wherein said gain value is higher for the carriers more tolerant to communication errors.

15. A peak reduction unit as set out in claim 12, wherein said gain circuits each comprise a multiplier receiving said peak reduction correction signal and multiplying it by a respective different gain value.

16. A peak reduction unit as set out in claim 10, wherein the input signal comprises digital samples represented by complex vectors and wherein the peak reduction calculation circuit comprises an algorithm processor which performs a complex vector calculation on the input samples to determine a complex correction vector which when added to the input sample results in a signal magnitude at or within a predetermined limit value.

17. A peak reduction unit as set out in claim 10, wherein the gain circuits are coupled between the peak reduction calculation circuit and the filters.

18. A peak reduction unit as set out in claim 10, wherein each of said filters provides a filtering operation limiting the correction signal to a frequency band corresponding to a band pass equivalent of one of the plural bands of the multi-carrier input signal.

19. A peak reduction unit as set out in claim 10, wherein at least one of said filters provides a filtering operation limiting the correction signal to a frequency band corresponding to plural adjacent bands of the multi-carrier input signal.

20. A method for signal peak reduction in a multi-carrier communication system, comprising:
    receiving as an input a multi-carrier communication signal band limited in plural bands;
    providing a peak reduction correction signal based on the amount the multi-carrier communication signal exceeds a threshold signal peak limit value;
    splitting the peak reduction correction signal into plural peak reduction correction signals on parallel signal paths;
    filtering the plural peak reduction correction signals to limit the bandwidth of the peak reduction correction signals; and
    combining the filtered peak reduction correction signals and the input multi-carrier communication signal to provide a peak reduced output communication signal band limited in a plurality of separate bands.

21. A method for signal peak reduction in a multi-carrier communication system as set out in claim 20, further comprising delaying the input multi-carrier communication signal prior to combining with the filtered peak reduction correction signal.

22. A method for signal peak reduction in a multi-carrier communication system as set out in claim 20, further comprising gain adjusting the peak reduction correction signals before said combining.

23. A method for signal peak reduction in a multi-carrier communication system as set out in claim 22, wherein said gain adjusting comprises employing a different gain value for different ones of said plural peak reduction correction signals.

24. A method for signal peak reduction in a multi-carrier communication system as set out in claim 23, wherein said multi-carrier communication signal comprises bands more and less tolerant to communication errors and wherein the gain value employed is higher for the bands more tolerant to communication errors.

25. A method for signal peak reduction in a multi-carrier communication system as set out in claim 24, wherein said bands more tolerant to communication errors comprise voice bands.

26. A method for signal peak reduction in a multi-carrier communication system as set out in claim 24, wherein said bands less tolerant to communication errors comprise data bands.

27. A method for signal peak reduction in a multi-carrier communication system as set out in claim 23, wherein said multi-carrier communication signal comprises an unused band or bands and a band or bands carrying voice or data and wherein the unused band or bands are used to contain a gain controlled portion of the peak reduction correction signal.

28. A method for signal peak reduction in a multi-carrier communication system as set out in claim 23, wherein said different gain values are determined based on the signal power of the corresponding band.

29. A method for signal peak reduction in a multi-carrier communication system as set out in claim 20, wherein said providing a peak correction signal comprises performing a peak reduction algorithm on said input multi-carrier communication signal to determine the peak correction signal.

30. A method for signal peak reduction in a multi-carrier communication system as set out in claim 20, further comprising detecting the magnitude of the input multi-carrier communication signal and comparing the magnitude to said signal peak limit value.

31. A method for signal peak reduction in a multi-carrier communication system as set out in claim 30, further comprising selectively outputting the peak reduction correction signal to be filtered and combined only when the magnitude of the input multi-carrier communication signal exceeds the magnitude of the signal peak limit value.

32. A method for signal peak reduction in a multi-carrier communication system as set out in claim 20, wherein the filtering operation limits the respective peak reduction correction signals to different frequency bands corresponding to the plural bands of the input multi-carrier communication signal.

33. A method for signal peak reduction in a multi-carrier communication system as set out in claim 32, wherein the filtering operation limits the peak reduction correction signals to frequency bands which are band pass equivalents of the respective plural bands of the input multi-carrier communication signal.

34. A method for signal peak reduction in a multi-carrier communication system as set out in claim 32, wherein the filtering operation limits the peak reduction correction signals to frequency bands which are narrower than the respective plural bands of the input multi-carrier communication signal.

35. A method for signal peak reduction in a multi-carrier communication system as set out in claim 20, wherein the filtering operation limits at least one of the peak reduction correction signals to a frequency band corresponding to plural adjacent bands of the multi-carrier input signal.

36. A method for signal peak reduction in a multi-carrier communication system as set out in claim 35, wherein the filtering operation limits plural of the peak reduction correction signals to frequency bands corresponding to plural adjacent bands of the multi-carrier input signal.

* * * * *